Patented Apr. 24, 1934

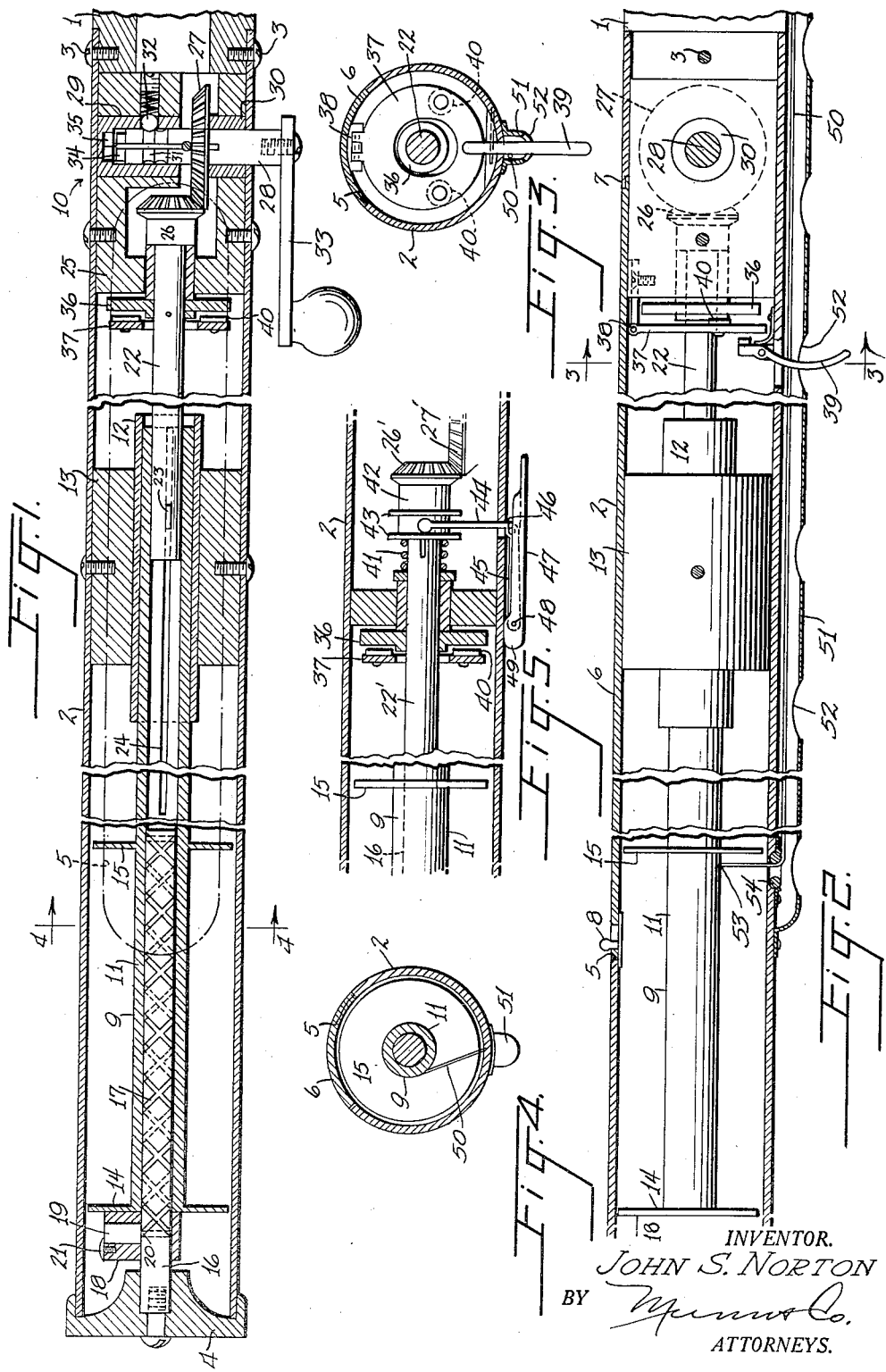

1,955,973

UNITED STATES PATENT OFFICE 1,955,973

FISHING REEL

John S. Norton, San Francisco, Calif.

Application August 29, 1932, Serial No. 630,914

10 Claims. (Cl. 43—20)

The present invention relates to improvements in a fishing reel, and its principal object is to provide a fishing reel that can be accommodated within the end of a fishing pole without calling for any enlargement of the end. A further object of the invention is to provide a fishing reel that is comparatively simple in construction and positive in action.

A further object of the invention is to combine with a fishing reel of the character set forth certain other features such as a brake mechanism, a clutch mechanism, and a locking means, all these different means being so organized into a unit as to fit into the hollow end of the pole.

A further object of the invention is to provide a driving means for the spool that will allow the latter to travel axially while it is being rotated so that the line may be fed on the revolving and advancing spool from a fixed point.

Further objects and advantages of my invention will appear as the specification proceeds.

The preferred form of my invention is illustrated in the accompanying drawing, in which Figure 1 shows an axial section through the end of a fishing pole having my reel mechanism provided therein;

Figure 2 an axial section taken at right angles to that of Figure 1;

Figure 3 a transverse section taken along line 3—3 of Figure 2;

Figure 4 a transverse section taken along line 4—4 of Figure 1; and

Figure 5 an axial section through a modified form of driving mechanism taken in the same plane as Figure 1.

While I have shown only the preferred form of the invention I wish to have it understood that various changes or modifications may be made within the scope of the claims hereto attached without departing from the spirit of the invention.

The fishing pole 1 which is indicated only fragmentarily in the drawing, terminates at its rear end in a hollow housing 2, preferably cylindrical in form and corresponding in diameter to the diameter of the adjacent end of the pole as shown in Figure 1. This housing may be secured to the end of the pole by means of screws as indicated at 3, while the rear end of the housing may be closed by a cap 4.

It will be understood that this housing really forms part of the pole and may be referred to as the hollow manipulating end of the pole. Access to the housing may be gained through an opening indicated at 5, which may be closed by a registering plate 6, which is preferably somewhat less than semi-cylindrical and which conforms to the outlines of the remainder of the housing. The front end of the plate 6 is formed with an offset fitting under a registering offset of the housing as indicated at 7, while the rear end of the plate is fastened to the rear end of the housing by means of a slidable latch 8.

The reel mechanism accommodated within the hollow end of the pole comprises in its principal features a spool 9 and an actuating mechanism 10 for the spool mounted forwardly of the latter. The spool itself forms part of a sleeve 11 which is slidably mounted in a bushing 12 supported in a bearing 13. The rear portion of the sleeve is made into a spool by means of two flanges 14 and 15 projecting from the sleeve in spaced relation. The spool portion of the sleeve is slidably mounted on a stem 16 projecting axially from the rear cap 4, and provided with an endless thread shown at 17. The sleeve itself has a block 18 formed integrally therewith, and a plug 19 is revolvably disposed within this block, and has a pin 20 projecting into the endless screw, the plug being free to turn to allow of change in the direction of the pin 20 at the end of each forward or rearward movement. The plug is held in place by a screw 21.

The front end of the sleeve receives a shaft 22 which is slidably mounted in the sleeve but held against rotary motion relative to the sleeve by means of a key 23 riding in a slot 24 of the sleeve. The front end of the shaft 22 is supported in a bearing 25 and terminates in a pinion 26, which latter is in mesh with a beveled gear 27 which is non-rotatably but slidably disposed on the transverse shaft 28 supported in bearings 29 and 30. The shaft 28 is formed with two circumferential grooves 31, either one of which may be engaged by a spring-pressed ball 32 so as to hold the shaft in either one of two positions. When the shaft is in the position shown in Figure 1 it is free to revolve and may be actuated by the crank handle 33. If the shaft 28 is pushed inwardly its angular end 34 enters an angular socket 35, which prevents rotation of the shaft and thus locks the mechanism.

The shaft 22 is provided with a disc 36 in the rear of the bearing 25, and a brake shoe 37 is pivoted to the housing as shown at 38 and may be actuated by means of a lever 39 for pressing two fiber plugs 40 projecting from the brake shoe against the disc 36 for retarding the rotary motion of the latter, and of the shaft 22.

In addition to the brake mechanism the shaft 22 may also have associated therewith a clutch mechanism as shown in Figure 5, in which case the pinion 26' is made slidable relative to the shaft 22', and is normally held in mesh with the gear 27' by a spring 41. The pinion forms the end of a sleeve 42 provided with spaced collars 43 which are adapted for engagement by the forked end 44 of a lever 45 pivoted at 46. The free end of the lever has pivoted thereto a handle 47 as shown at 48, the handle being formed with a cam 49 so that when the handle is thrown outward it urges the pivot 48 away from the housing, and thereby causes the forked end of the lever to push the pinion out of engagement with the gear 27'.

The line 50 is accommodated in its rear portion in a small elongated housing 51 provided with a number of openings 52 for facilitating manipulation of the string, and the rear end of the string is fastened to the spool as shown at 53, the string passing through an agate ring 54 mounted in the wall of the housing.

The operation of the device is as follows: Normally the gear and the pinion are in engagement and to wind the string it is only necessary to turn the crank 33. This causes the shaft 22 to rotate and the rotary motion is transmitted to the sleeve 9 which latter is made to travel back and forth due to the engagement of the pin 20 with the endless thread on the stem 16. As the spool revolves and passes back and forth the string 50 is fed through the agate ring and is wound upon the spool in single layers. For ordinary fishing the clutch is not required but for casting it is preferable to have a clutch so that the spool may unwind without involving the crank 33. If a bite has been obtained the brake may be worked for opposing the pull of the fish. If it is desired to dispense with the reel altogether it is only necessary to push in the transverse shaft 28 which locks the latter shaft against rotary movement.

It will be seen that the construction described hereinabove is compact, conveniently accommodated within the hollow end of the rod, and at the same time contains all the features which are desirable in a device of the character described.

I claim:

1. In a fishing reel, a fishing pole having a hollow manipulating end, a fixed axial stem in said end having an endless thread thereon, a spool on said stem having a pin engaging with the thread for imparting reciprocating motion to the spool when the latter is rotated, means for rotating the spool, a line and means for feeding the line on the spool.

2. In a fishing reel, a fishing pole having a hollow manipulating end, a spool supported in said end with freedom of axial and revolving motion, means for actuating the spool for effecting such motion including a transverse shaft movable axially between two positions, locking means for locking the shaft in one of said positions, a line, and means for traversing the line on the spool.

3. In a fishing reel, a fishing pole having a hollow manipulating end, an axial stem extending into the hollow end from the rear thereof and having an endless thread thereon, a sleeve slidable on the stem and having a pin extending into the thread for imparting reciprocating motion to the sleeve when the latter is rotated, elements projecting from the sleeve to form a spool on the rear end thereof, a bearing for the front end of the spool, a shaft non-rotatably and slidably extending into the front end of the sleeve, a bearing for the shaft, a pinion at the end of the shaft, a second shaft mounted transversely in the pole and having a gear meshing with the pinion, and a crank for rotating the second shaft.

4. In a fishing reel, a fishing pole having a hollow manipulating end, an axial stem extending into the hollow end from the rear thereof and having an endless thread thereon, a sleeve slidable on the stem and having a pin extending into the thread for imparting reciprocating motion to the sleeve when the latter is rotated, elements projecting from the sleeve to form a spool on the rear end thereof, a bearing for the front end of the spool, a shaft non-rotatably and slidably extending into the front end of the sleeve, a bearing for the shaft, a pinion at the end of the shaft, a second shaft mounted transversely in the pole with freedom of axial movement, yielding means for holding the shaft in either of two positions, a driving means for the pinion on the shaft, a crank for the shaft, and means for holding the latter shaft against rotation in one of its positions.

5. In a fishing reel, a fishing pole having a hollow manipulating end, an axial stem extending into the hollow end from the rear thereof and having an endless thread thereon, a sleeve slidable on the stem and having a pin extending into the thread for imparting reciprocating motion to the sleeve when the latter is rotated, elements projecting from the sleeve to form a spool on the rear end thereof, a bearing for the front end of the spool, a shaft non-rotatably and slidably extending into the front end of the sleeve, a bearing for the shaft, a pinion at the end of the shaft, means for driving the pinion, a disc on the shaft and a brake shoe pivoted to a fixed support and adapted for engagement with the disc for holding the shaft against rotary motion.

6. In a fishing reel, a fishing pole, a shaft extending transversely into the pole and having a gear thereon within the pole, a shaft extending axially through the pole and having a pinion meshing with the gear, a spool operatively connected with the second shaft in driving relation, and means for turning the transverse shaft, the latter shaft being movable between two positions and having means associated therewith for locking the same against rotation in one of the positions.

7. In a fishing reel, a fishing pole having a hollow manipulating end, a fixed axial stem extending into the hollow end from the rear thereof and having an endless thread thereon, a sleeve slidable on the stem and having a pin extending into the thread for imparting reciprocating motion to the sleeve when the latter is rotated, a spool formed on the sleeve and means associated with the sleeve for imparting rotary motion to the same whereby the sleeve is reciprocated.

8. In a fishing reel, a fishing pole having a hollow manipulating end, an axial stem extending into the hollow end from the rear thereof and having an endless thread thereon, a sleeve slidable on the stem and having a pin extending into the thread for imparting reciprocating motion to the sleeve when the latter is rotated, a spool formed on the rear end of the sleeve, a bearing for the front end of the sleeve and means associated with the front end of the sleeve for imparting rotary motion to the same.

9. In a fishing reel, a fishing pole having a hollow manipulating end, an axial stem fixedly supported in said end, and having an endless thread thereon, a sleeve slidable on the stem and having a pin extending into the thread for imparting reciprocating motion to the sleeve when the latter is rotated, a spool formed on the sleeve and means associated with the sleeve for imparting rotary motion to the same whereby the sleeve is reciprocated.

10. In a fishing reel, a fishing pole having a hollow manipulating end, an axial stem fixedly supported therein and having an endless thread thereon, a sleeve slidable on the stem and having a pin extending into the thread for imparting reciprocating motion to the sleeve when the latter is rotated, a spool formed on one end of the sleeve, a bearing for the other end of the sleeve, and means associated with the latter end for imparting rotary motion to the same.

JOHN S. NORTON.